(12) United States Patent
Kanade et al.

(10) Patent No.: US 12,515,161 B2
(45) Date of Patent: Jan. 6, 2026

(54) COMPACT AIR CLEANER ASSEMBLY WTH NOISE REDUCTION DEVICE

(71) Applicant: Cummins Filtration Inc., Nashville, TN (US)

(72) Inventors: Shantanu Vaman Kanade, Pune (IN); Ruchi Lutade, Pune (IN); Michael T. Zuroski, Sun Prairie, WI (US); Devendra Kalaskar, Pune (IN); Narendra Kumar Tripathi, Pune (IN)

(73) Assignee: Cummins Filtration Inc., Nashville, TN (US)

( * ) Notice: Subject to any disclaimer, the term of this patent is extended or adjusted under 35 U.S.C. 154(b) by 504 days.

(21) Appl. No.: 17/796,010

(22) PCT Filed: Jan. 12, 2021

(86) PCT No.: PCT/US2021/013090
§ 371 (c)(1),
(2) Date: Jul. 28, 2022

(87) PCT Pub. No.: WO2021/154490
PCT Pub. Date: Aug. 5, 2021

(65) Prior Publication Data
US 2023/0057475 A1    Feb. 23, 2023

(30) Foreign Application Priority Data
Jan. 31, 2020   (IN) .............................. 202041004392

(51) Int. Cl.
*B01D 46/42*    (2006.01)
*B01D 46/00*    (2022.01)
(Continued)

(52) U.S. Cl.
CPC ..... *B01D 46/4236* (2013.01); *B01D 46/0004* (2013.01); *B01D 46/2411* (2013.01);
(Continued)

(58) Field of Classification Search
CPC ............ B01D 46/4236; B01D 46/0004; B01D 46/2411; B60T 17/002; B60T 17/008;
(Continued)

(56) References Cited

U.S. PATENT DOCUMENTS

| 2003/0159587 A1 | 8/2003 | Letourneau et al. |
| 2004/0065288 A1 | 4/2004 | Kino et al. |

(Continued)

FOREIGN PATENT DOCUMENTS

EP     0 859 906     8/1998

OTHER PUBLICATIONS

International Search Report and Written Opinion issued for PCT Application No. PCT/US2021/013090 issued May 12, 2021, 24 pages.

*Primary Examiner* — Jennifer Dieterle
*Assistant Examiner* — Qianping He
(74) *Attorney, Agent, or Firm* — Benesch Friedlander Coplan & Aronoff LLP

(57) ABSTRACT

An air cleaner assembly comprises a filter element and a housing assembly. The filter element comprises a filter media for filtering a fluid and a first endcap positioned along a first end of the filter media and through which a first filtered air flow portion flows. The housing assembly at least partially contains the filter element and comprises a cover that defines a first outlet through which the first filtered air flow portion flows to a downstream device. The cover comprises a noise reduction device that receives the first filtered air flow portion and dissipates sound waves traveling upstream from the downstream device.

24 Claims, 10 Drawing Sheets

(51) Int. Cl.
    *B01D 46/24*     (2006.01)
    *B60T 17/00*     (2006.01)
    *F02M 35/02*     (2006.01)
    *F02M 35/024*     (2006.01)
    *F02M 35/14*     (2006.01)

(52) U.S. Cl.
    CPC .......... *B60T 17/002* (2013.01); *B60T 17/008* (2013.01); *F02M 35/0201* (2013.01); *F02M 35/02483* (2013.01); *F02M 35/14* (2013.01)

(58) Field of Classification Search
    CPC ......... F02M 35/0201; F02M 35/02483; F02M 35/14
    USPC .......... 96/381, 384, 388; 181/256, 258, 206, 181/252, 264, 212, 250, 276; 55/DIG. 21, 442; 123/184.56, 184.57
    See application file for complete search history.

(56) References Cited

U.S. PATENT DOCUMENTS

| | | | |
|---|---|---|---|
| 2005/0247034 A1 | 11/2005 | Canova et al. | |
| 2005/0284692 A1* | 12/2005 | McWilliam | F02M 35/1261 181/258 |
| 2009/0301042 A1* | 12/2009 | Troxell | B01D 46/2411 55/330 |
| 2011/0139110 A1* | 6/2011 | Miller | B01D 46/003 123/184.53 |
| 2016/0102637 A1* | 4/2016 | Desjardins | F02M 35/02 55/385.3 |
| 2018/0169555 A1* | 6/2018 | Von Seggern | B01D 46/0004 |
| 2018/0369732 A1* | 12/2018 | Karlsson | B01D 46/0047 |

\* cited by examiner

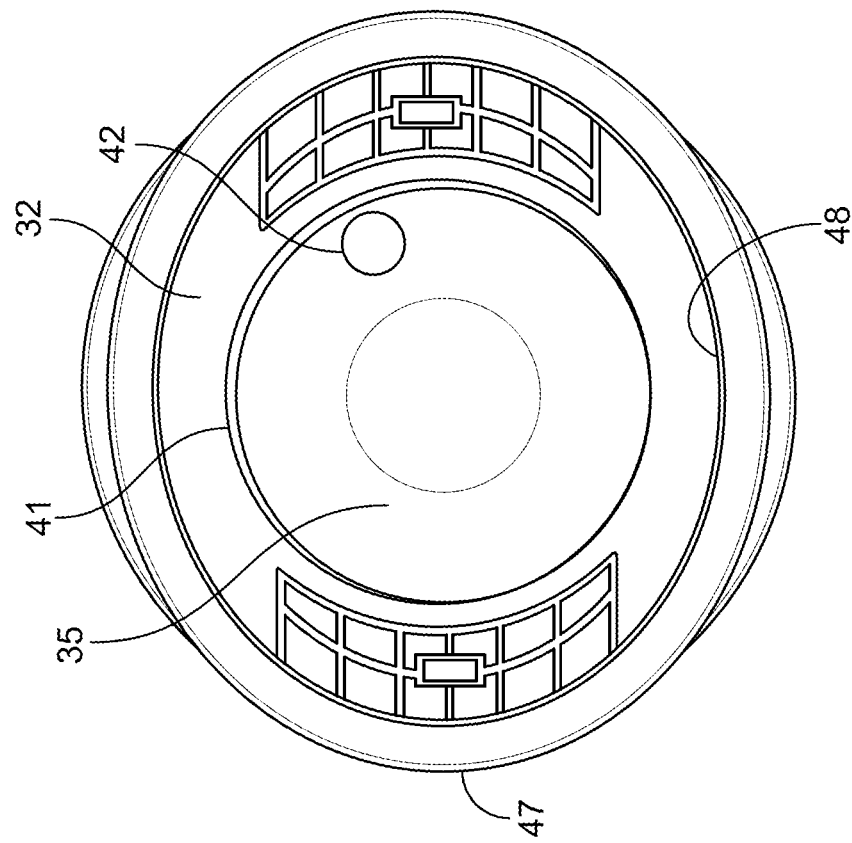
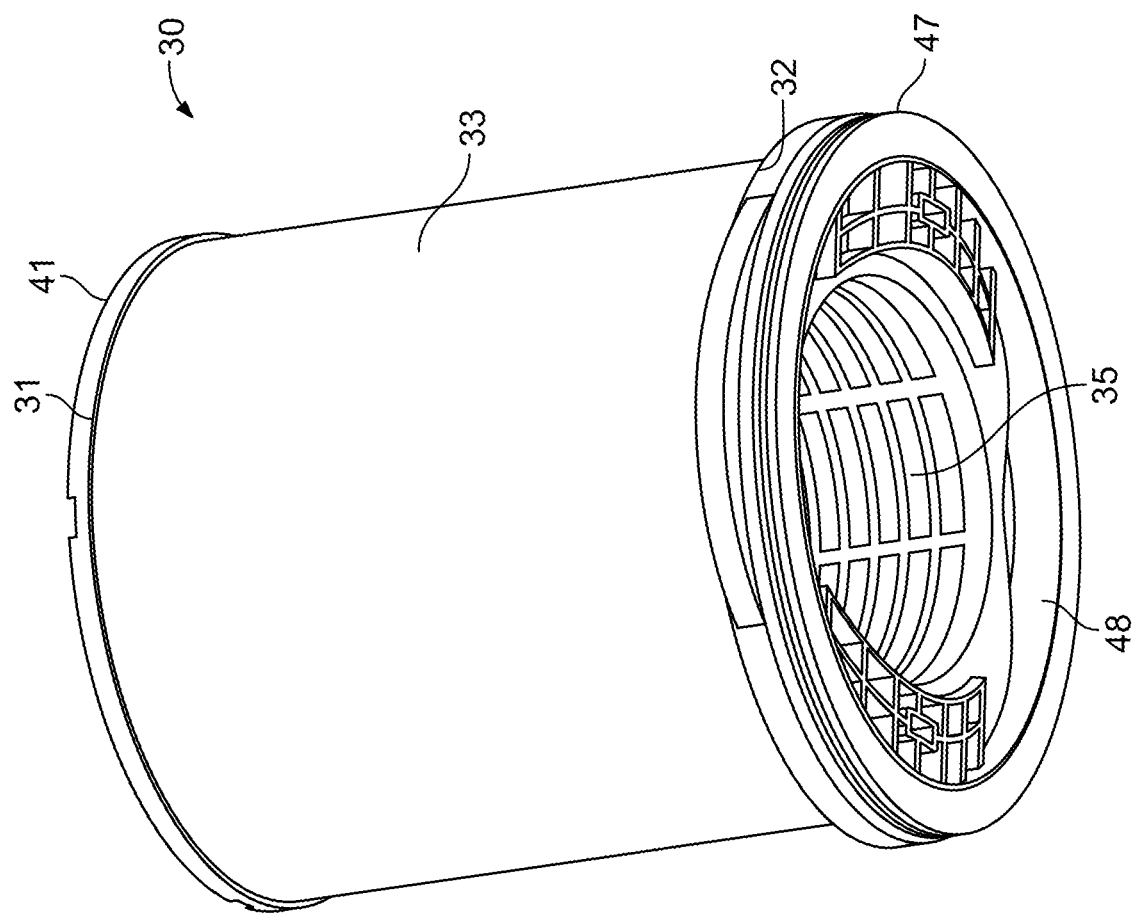
FIG. 2B
FIG. 2A

COMPACT AIR CLEANER ASSEMBLY WTH NOISE REDUCTION DEVICE

CROSS REFERENCE TO RELATED APPLICATIONS

This application is a U.S. National Phase of PCT Application No. PCT/US2021/013090, filed Jan. 12, 2021 which claims priority to and the benefit of Indian Provisional Patent Application No. 20/2041004392, filed Jan. 31, 2020 and the contents of which are incorporated herein by reference in its entirety. The contents of these applications are incorporated herein by reference in their entirety.

FIELD

The present application relates generally to air cleaner assemblies used for supplying filtered air to brake compressors or other devices.

BACKGROUND

Various conventional air cleaner assemblies may provide filtered air flow to a brake compressor. However, along the path of air flow to the brake compressor, noise may travel in the opposite direction into the air cleaner assembly, which increases the overall noise level.

SUMMARY

Various embodiments provide for an air cleaner assembly comprising a filter element and a housing assembly. The filter element comprises a filter media for filtering a fluid and a first endcap positioned along a first end of the filter media and through which a first filtered air flow portion flows. The housing assembly at least partially contains the filter element and comprises a cover that defines a first outlet through which the first filtered air flow portion flows to a downstream device. The cover comprises a noise reduction device that receives the first filtered air flow portion and dissipates sound waves traveling upstream from the downstream device.

Various embodiments provide for a housing assembly for at least partially containing a filter element for filtering a fluid. The housing assembly comprises a cover and a housing body. The cover defines a first outlet through which a first filtered air flow portion flows to a first downstream device. The cover comprises a noise reduction device that receives the first filtered air flow portion and dissipates sound waves traveling upstream from the first downstream device. The housing body is removably attachable to the cover and defines a second outlet through which a second filtered air flow portion flows to a second downstream device.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 2A is a perspective view of the filter element of the air cleaner element of FIG. 1A.

FIG. 2B is an end view of the filter element of FIG. 2A.

DETAILED DESCRIPTION

Referring to the figures generally, various embodiments disclosed herein relate to an air cleaner assembly with a noise reduction device.

Air Cleaner Assembly

Figure 1A:
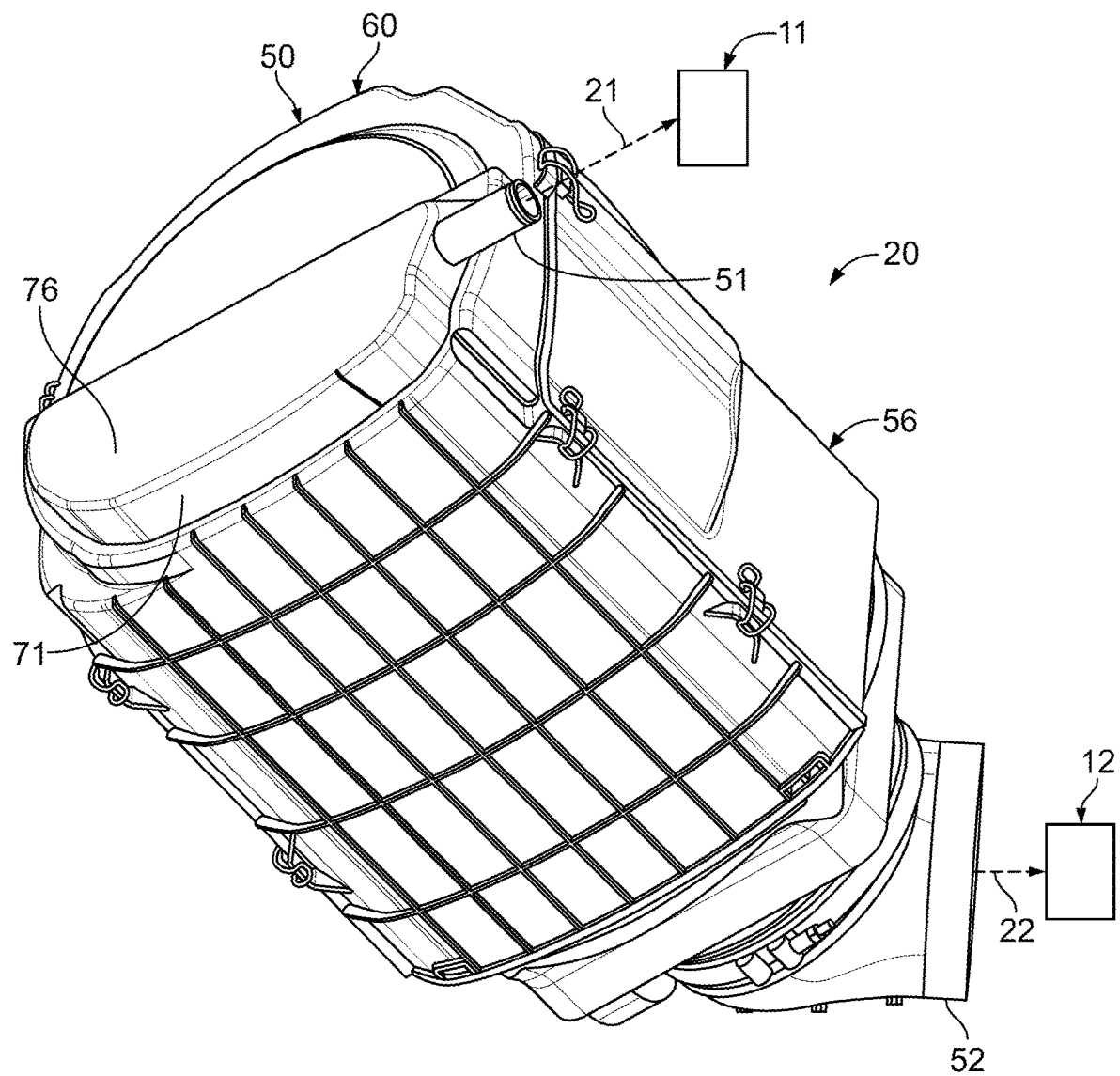
FIG. 1A is a perspective view of an air cleaner assembly according to one embodiment.

As shown in FIG. 1A, an air cleaner assembly 20 is configured to provide filtered air flow to different downstream devices, such as a brake compressor 11 (which may be a first downstream device) and an engine 12 (which may be a second downstream device). Accordingly, the air cleaner assembly 20 of FIG. 1A comprises two outlets: a first outlet 51 through which filtered air flows to the brake compressor 11 (as a first filtered air flow portion 21) and a second outlet 52 through which filter air flows to the engine 12 (as a second filtered air flow portion 22).

Figure 1B:
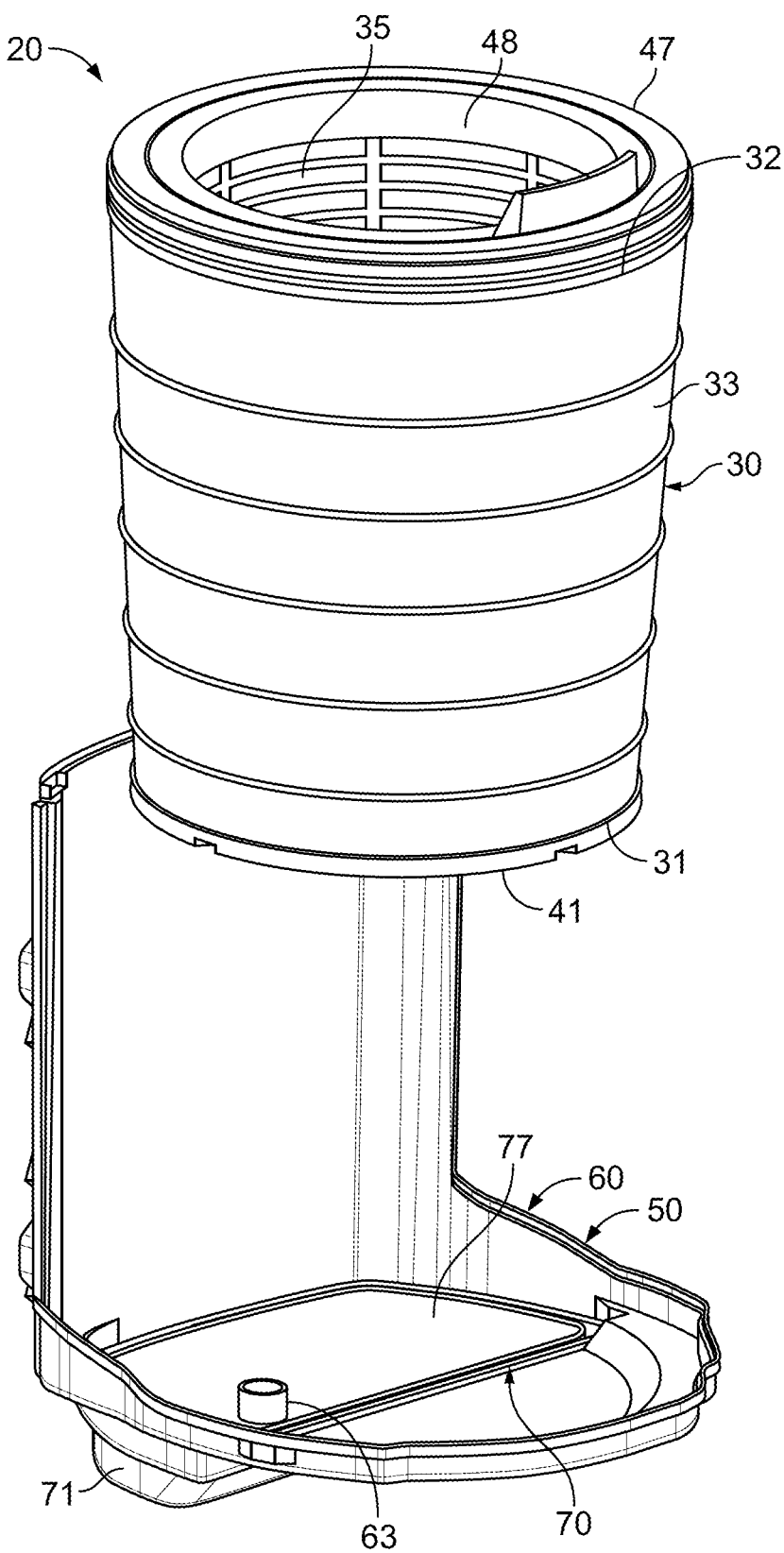
FIG. 1B is an exploded view of a filter element and a portion of a housing assembly of the air cleaner assembly of FIG. 1A.

The air cleaner assembly 20 comprises a housing assembly 50 (as shown in FIGS. 1A-1B) and a filter element 30 (as shown in FIGS. 1B-3) that is configured to filter a fluid and be positioned at least partially within the housing assembly 50.

Housing Assembly

As shown in FIGS. 1A-1B, the housing assembly 50 comprises a main housing body 56 and a service cover 60 (as described further herein). The main housing body 56 and the cover 60 are configured to removably (and reattachably) attach to each other to at least partially or completely enclose, surround, and contain the filter element 30 such that the filter element 30 is at least partially contained or housed within the housing assembly 50. The main housing body 56 and/or the cover 60 may extend along the axial length of the filter element 30. The cover 60 may also extend along one end of the filter element 30 (corresponding to the first end 31 of the filter media 33), and the main housing body 56 may also extend along the other end of the filter element 30 (corresponding to the second end 32 of the filter media 33).

Figure 3:
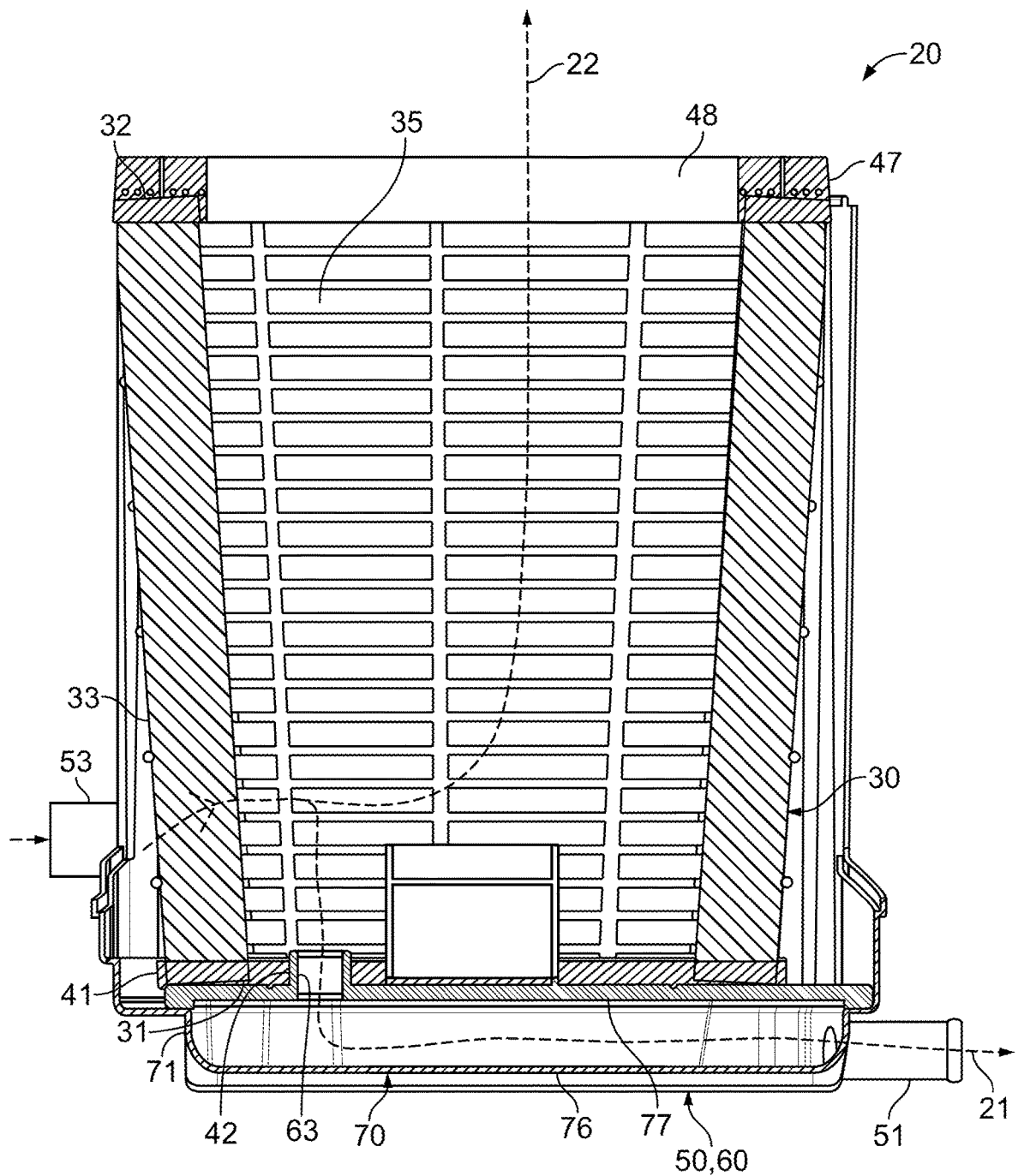
FIG. 3 is a cross-sectional view of the air cleaner assembly of FIG. 1A.

As shown in FIG. 3, the housing assembly 50 comprises a housing assembly inlet 53 to allow unfiltered air to enter and flow into the housing assembly 50 and be filtered by the filter element 30. As shown in FIG. 1A, in order to allow filtered fluid to flow to two different devices (after flowing through and being filtered by the filter element 30), the housing assembly 50 defines the two outlets (i.e., the first outlet 51 and the second outlet 52) for filtered air to exit the housing assembly 50. The first outlet 51 is defined by the cover 60, and the second outlet 52 is defined by the main housing body 56. However, it is understood that the cover 60 may also define the second outlet 52. The first outlet 51 is substantially smaller than the second outlet 52 to restrict fluid flow to the brake compressor 11 and to direct more fluid to flow to the engine 12. The first filtered air flow portion 21 (which may be the secondary air flow portion) flows from the filter element 30 (via the cover 60), through the first outlet 51 (which may be the secondary outlet), and to the brake compressor 11 (a first downstream device). The second filtered air flow portion 22 (which may be the primary or main air flow portion) flows from the filter element 30, through the second outlet 52 (which may be the primary or main outlet), and to the engine 12 (a second downstream device).

Filter Element

As shown in FIGS. 1B-2A, the filter element 30 comprises a filter media 33 configured to filter a fluid, a first endcap 41 (e.g., a bottom endcap), and a second endcap 47 (e.g., a top endcap).

As shown in FIG. 2A, the filter media 33 extends axially between and comprises a first end 31 and a second end 32. The filter media 33 may be substantially cylindrical and hollow, defining an inner area 35. However, the filter media may have a variety of cross-sectional shapes, including circular, oval, rectangular, rounded rectangular, and racetrack shapes. Unfiltered fluid flows from the outer radial surface, through the filter media 33 to the inner radial surface, and into the inner area 35 as filtered fluid (as shown in FIG. 3). However, it is understood that the filter media 33 (and the air cleaner assembly 20) may be configured such that the fluid is filtered in the opposite direction.

The first endcap 41 is positioned along the first end 31 of the filter media 33 and defines an outlet port 42 (as shown in FIGS. 2B-3) through which the first filtered air flow portion 21 flows from the inner area 35 of the filter media 33, through the first endcap 41, into and through the cover 60 (through the inlet 63 of the cover 60) (and eventually to first outlet 51 of the cover 60 and to the brake compressor 11, as shown in FIG. 1A). The outlet port 42 may be configured to at least partially receive the inlet 63 of the cover 60 (as shown in FIG. 3). Aside from the outlet port 42, the first endcap 41 may be a closed endcap that completely blocks the first end 31 of the filter media 33, including along the inner area 35 of the filter media 33. The outlet port 42, however, is positioned along and axially aligned with the inner area 35 of the filter media 33 and provides a relatively small area for fluid to flow through the first endcap 41 (compared to the size of the first endcap 41 and the inner area 35 of the filter media 33). Accordingly, the first end 31 of the filter media 33 restricts the amount of the first filtered air flow portion 21 that can flow to and through the first outlet 51 (compared to the amount of the second filtered air flow portion 22 that can flow to and through the second end 32 of the filter media 33).

The second endcap 47 is positioned along the second end 32 of the filter media 33 and defines an opening 48 (as shown in FIGS. 2A-3A) through which the second filtered air flow portion 22 flows from the inner area 35 of the filter media 33, through the second endcap 47, and through the second outlet 52 of the housing assembly 50 (and eventually to the engine 12, as shown in FIG. 1A). The second endcap 47 may be substantially open such that the second endcap 47 extends along the media portion of the first end 31 along the filter media 33 and the opening 48 extends along (and is axially aligned with) the majority of (or all of) the inner area 35 of the filter media 33. Accordingly, the second end 32 of the filter media 33 is left more open for the second air flow portion 22 to flow substantially unrestricted to the second outlet 52 (compared to the first end 31 of the filter media 33). In particular, the second endcap 47 allows the second filtered air flow portion 22 to flow relatively unrestricted through the opening 48 and to the second outlet 52 compared to the first endcap 41, which provides relatively greater restriction of the flow of the first filtered air flow portion 21 through the outlet port 42 and to the first outlet 51.

According to one embodiment, the filter element 30 of the air cleaner assembly 20 may also have a resonator to reduce noise (in particular engine noise), in addition to the noise reduction device 70 in the cover 60 of the air cleaner assembly 20 (as described further herein).

Service Cover

As shown in FIGS. 1B and 3, the service cover 60 of the housing assembly 50 defines an cover inlet 63 through which the first filtered air flow portion 21 flows from the inner area 35 of the filter media 33 and into the service cover 60 (in particular into the noise reduction device 70). The inlet 63 may extend into and through the outlet port 42 of the first endcap 41 (as shown in FIG. 3).

As shown in FIG. 3 (as well as FIG. 1A), the cover 60 also defines the first outlet 51 of the housing assembly 50 (that is downstream from the inlet 63) through which the first filtered air flow portion 21 flows out from the cover 60 (after passing through the noise reduction device 70 of the cover 60).

To reduce noise, the service cover 60 comprises a noise reduction device 70 (which may also be referred to as a sound attenuation device or component, acoustic resonator, or silencer) that is configured to provide acoustic dampening and reduce and control the amount of noise, in particular noise coming from downstream of the first outlet 51 (e.g., from the brake compressor 11). The noise reduction device 70 is configured to receive the first filtered air flow portion 21 flowing downstream and dissipate sound waves traveling upstream from the brake compressor 11 (which is the first downstream device), optionally providing sound transmission loss at specific frequencies and broadband attenuation.

The noise reduction device 70 is integrated into and incorporated with the body of the cover 60 and has a compact configuration with the rest of the cover 60. The noise reduction device 70 is positioned between the inlet 63 and the first outlet 51 of the cover 60 along a flow path of the first filtered air flow portion 21. Accordingly, after flowing into the cover 60 through the inlet 63, the first filtered air flow portion 21 flows through the noise reduction device 70 and subsequently out from the cover 60 (and therefore out from the housing assembly 50) through the first outlet 51. As described further herein, the cover 60, including the noise reduction device 70, is a compact device.

As shown in FIGS. 1A-1B and 3, the noise reduction device 70 comprises an outer wall 76 and an inner wall 77 on opposite sides of the noise reduction device 70 and at least one side wall 71 that extends between (and may be approximately perpendicular to) the outer wall 76 and the inner wall 77. As shown in FIG. 3, the inner wall 77 is closer to the filter element 30 than the outer wall 76 and fluidly separates the inner area 35 of the filter element 30 from the inner area of the noise reduction device 70 (except through the inlet 63). The side walls 71 and the outer wall 76 are some of the outermost walls of the cover 60 (and therefore of the housing assembly 50). The inner wall 77 may define the inlet 63 (such that the inlet 63 extends through the inner wall 77 in an axial direction), and the side walls 71 may define the first outlet 51 (such that the first outlet 51 extends through the side wall 71 in a radial direction). The first filtered air flow portion 21 flows from the inlet 63 to the first outlet 51 (and through the noise reduction device 70, and thereby through the cover 60) in an inner area of the noise reduction device 70 that is between and defined by the inner wall 77, the outer wall 76, and the side walls 71.

As described further herein, the noise reduction device 70 may have a variety of different configurations to reduce the amount of noise. Each of the various embodiments of the noise reduction device 70 have various combinations of noise-reducing features and flow passages that allow both air and sound to pass through. In particular, each of the noise reduction devices 70 defines a main flow passage 72 that extends directly (and optionally in a substantially straight line) between the inlet 63 and the first outlet 51, as shown in FIGS. 4A-4B and 5-7. The main flow passage 72 is positioned and arranged such that the first filtered air flow portion 21 flows through the main flow passage 72 (and thereby through the noise reduction device 70 and through the cover 60), from the inlet 63 to the first outlet 51. The main flow passage 72 is also positioned and arranged such that sound waves 73 also flow through the main flow passage 72 (and thereby through the noise reduction device 70 and through the cover 60), from the first outlet 51 to the inlet 63 (in the opposite direction as the first filtered air flow portion 21).

Air Flow through the Cover

As shown in FIG. 3, after the unfiltered air flows into the inlet 53 of the housing assembly 50 of the air cleaner assembly 20, the unfiltered air flow into and through the filter media 33 for filtration and is converted to a filtered air flow along an unfiltered side (e.g., within the inner area 35) of the filter media 33. After the air flows through the filter media 33 from the outer surface of the filter media 33 to the inner surface of the filter media 33 and into the inner area 35 of the filter media 33 (and is thereby filtered), the filtered air flow separates or splits into the first filtered air flow portion 21 and the second filtered air flow portion 22, downstream of the filter media 33 and within the inner area 35 of the filter media 33.

The opening 48 of the second endcap 47 is significantly larger (in cross-sectional area) than outlet port 21 of the first endcap 41 and the inlet 63 of the cover 60. Accordingly, due to the restrictive size of the outlet port 42 of the first endcap 41 (and the inlet 63 of the cover 60) compared to the larger and less restrictive size of the opening 48 of the second endcap 47, more air flows through the inner area 35 of the filter media 33 (toward the second end 32 of the filter media 33), through the opening 48 of the second endcap 47, and out through the second outlet 52 to the engine 12 as the second filtered air flow portion 22. The rest of the filtered air flows through the inner area 35 of the filter media 33 (toward the first end 31 of the filter media 33), through the outlet port 42 of the first endcap 41 and into the inlet 63 of the cover 60, through the cover 60 (and the noise reduction device 70), and out through the first outlet 51 to the brake compressor 11 as the first filtered air flow portion 21. A flow of the second filtered air flow portion 22 flows relatively more unrestricted to the second outlet 52 compared to a flow of the first filtered air flow portion 21 to the first outlet 51.

As the first filtered air flow portion 21 flows toward the brake compressor 11 (from the inlet 63 of the cover 60, through the main flow passage 72, and to the first outlet 51), the sound waves 73 from the brake compressor 11 flow toward and into the air cleaner assembly 20 from the brake compressor 11 (in the opposite direction as the first filtered air flow portion 21), through a natural flow passage within the cover 60 (e.g., the main flow passage 72). Accordingly, the sound waves 73 flow into the housing assembly 50 (in particular into the noise reduction device 70 of the cover 60) through and from the first outlet 51 and subsequently flow through the main flow passage 72, through the inlet 63 of the cover 60, and into the inner area 35 of the filter element 30.

Noise Reduction Device with Dead-End Channel

Figure 4A:
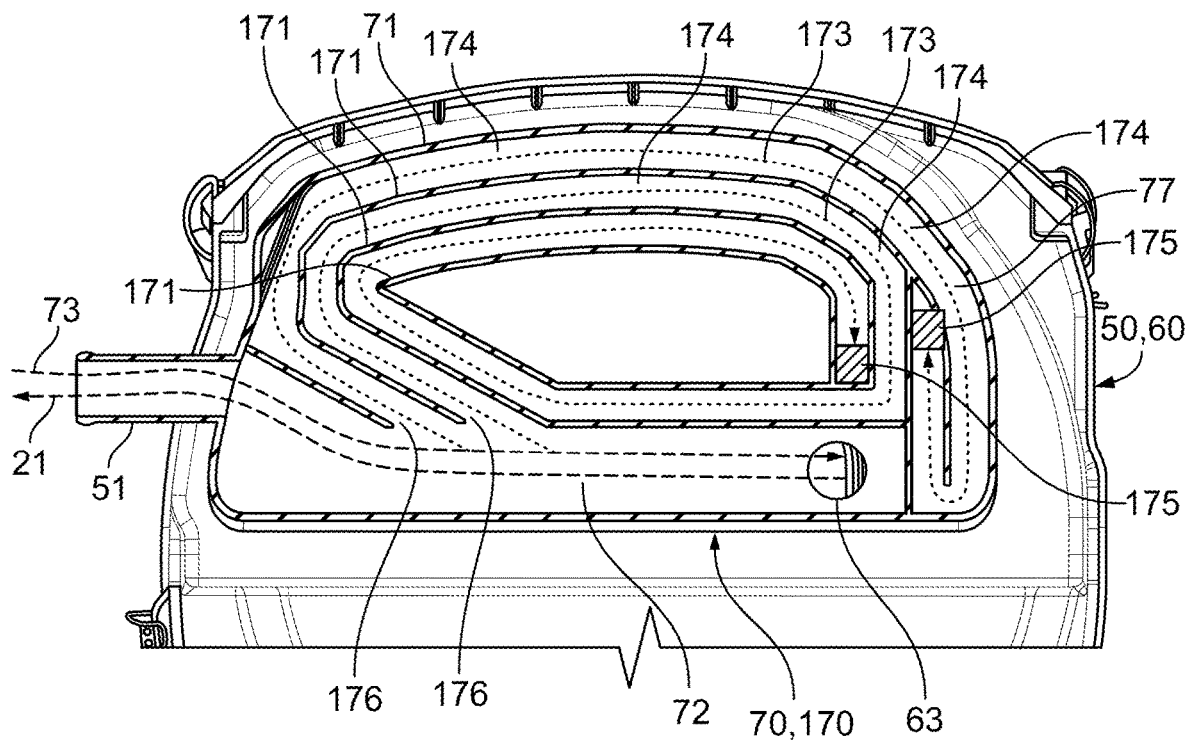
FIG. 4A is a cross-sectional view of a portion of a cover of the housing assembly of the air cleaner assembly according to one embodiment showing air flow and sound wave flow.
Figure 4B:
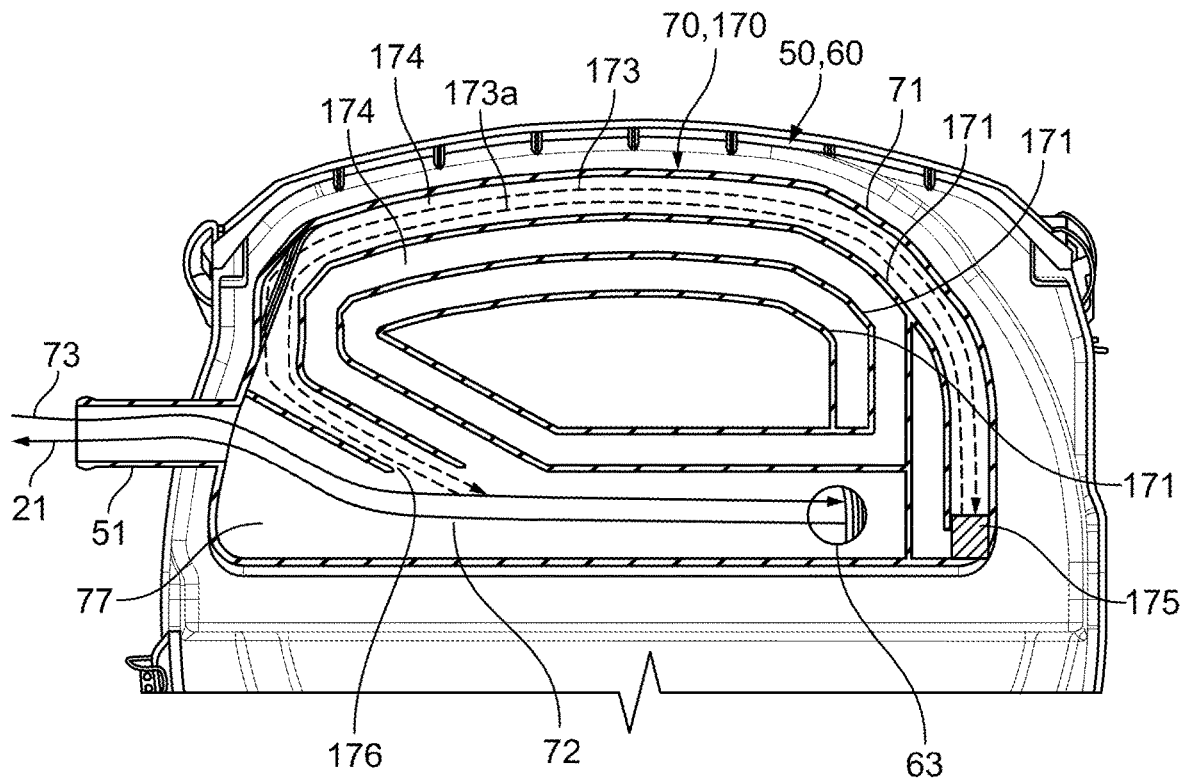
FIG. 4B is a cross-sectional view of the portion of the cover of FIG. 4A showing a reflected sound wave portion.

According to one embodiment as shown in FIGS. 4A-4B, the noise reduction device 70 may be a dead-end channel noise reduction device 170, which comprises at least one internal wall 171 and defines the single main flow passage 72 and at least one dead-end channel 174 that comprises a dead end 175. The at least one dead-end channel 174 is configured to receive a portion of the sound wave 73 (i.e., a sound wave portion 173).

The at least one dead-end channel 174 comprises a dead-end channel inlet 176 that is positioned along the main flow passage 72 and provides an area for the sound wave portion 173 to enter or flow into the dead-end channel 174 from the main flow passage 72. Each wall 171 defines at least a portion of at least one dead-end channel 174 and its dead end 175 (optionally with the side walls 71) and extends along its height between the outer wall 76 and the inner wall 77 of the noise reduction device 70 (in a direction parallel to the side walls 71) such that each dead-end channel 174 are completely enclosed by the various walls except for at their dead-end channel inlets 176. The walls 171 define each of the dead ends 175, where the walls 171 enclose the end of the dead-end channel 174. The dead ends 175 prevent the sound wave portion 173 from traveling any further along the length of the dead-end channel 174 (in its original direction of flow) and cause the sound wave portion 173 to switch or reverse directions within the dead-end channel 174 and flow the opposite direction through the dead-end channel 174. The dead ends 175 are the end of the dead-end channel 174 that are approximately the same size (i.e., provide approximately the same flow area or cross-sectional area) as the rest of (or the majority of) the dead-end channel 174.

Each dead-end channel 174 (also referred to as a quarter wavelength acoustic resonator) is configured to dissipate and cancel the sound waves 73 that enter into the noise reduction device 70 (through the first outlet 51) from the brake compressor 11, which results in overall noise reduction. Each dead-end channel 174 extends from and branch off of a middle portion of the main flow passage 72 at the dead-end channel inlet 176 (i.e., the respective dead-end channel inlet 176 of each dead-end channel 174 is positioned along the length of the main flow passage 72) and defines an area or path for the sound wave portion 173 (and the reflected sound wave portion 173a) to flow through. Each dead-end channel 174 may optionally be angled at an oblique angle relative to the main flow passage 72, in particular along their respective dead-end channel inlets 176.

The dead-end channels 174 each have a substantial length and may include at least one (e.g., multiple) turns and curves before the dead end 175. For example, a dead-end channel 174 may spiral around itself and/or curve in U-turn (i.e., 180°) about an end of a wall 171 before the dead end 175. The walls 171 (and the side walls 71) direct a sound wave portion 173 within the respective dead-end channel 174 to turn and curve along the length of the dead-end channel 174 such that the sound wave portion 173 changes direction multiple times within the dead-end channel 174 before reaching the dead end 175.

According to one embodiment, the dead-end channel noise reduction device 170 may define at least two dead-end channels 174 (e.g., a first dead-end channel and a second dead-end channel) that curve or spiral around each other and/or themselves. The dead-end channels 174 may flow in parallel with each other along only a portion or the entirety of their lengths. The dead-end channels 174 may share at least one common wall 171 (such that a first surface of the wall 171 defines, corresponds to, and faces at least a portion of a first dead-end channel 174 and a second surface of the wall 171 defines, corresponds to, and faces at least a portion of a second dead-end channel 174), which allows the dead-end channel noise reduction device 170 to have a compact design and meet the user's packaging space requirements.

As the sound waves 73 from the brake compressor 11 flow toward and into the air cleaner assembly 20 (as described further herein), the dead-end channels 174 allow at least a portion of the sound waves 73 flowing through the main flow passage 72 (e.g., the sound wave portion 173) to flow into and through each of the dead-end channels 174, curving along the entire length of the dead-end channel 174 until the sound wave portion 173 hits the dead end 175, as shown in FIG. 4A. Once the sound wave portion 173 hits the dead end 175, a phase shift occurs which reverses the direction of the sound wave portion 173, thereby creating a reflected sound wave portion 173a within the dead-end channel 174 that flows in the opposite direction as the sound wave portion 173 along the length of the dead-end channel 174 (as shown in FIG. 4B). The reflected sound wave portion 173a interacts with the sound wave portion 173, which results in noise reduction.

The sound wave portion 173 refers to the portion of the sound waves 73 that enters into the dead-end channel 174 through the dead-end channel inlet 176 and is traveling away from the main flow passage 72, through the dead-end channel 174, and toward the dead end 175 (along the length of the dead-end channel 174). The reversed or reflected sound wave portion 173a refers to the portion of the sound waves 73 that is traveling away from the dead end 175, through the dead-end channel 174, and toward the main flow passage 72 (along the length of the dead-end channel 174), in particular after contacting the dead end 175.

Figure 4C:
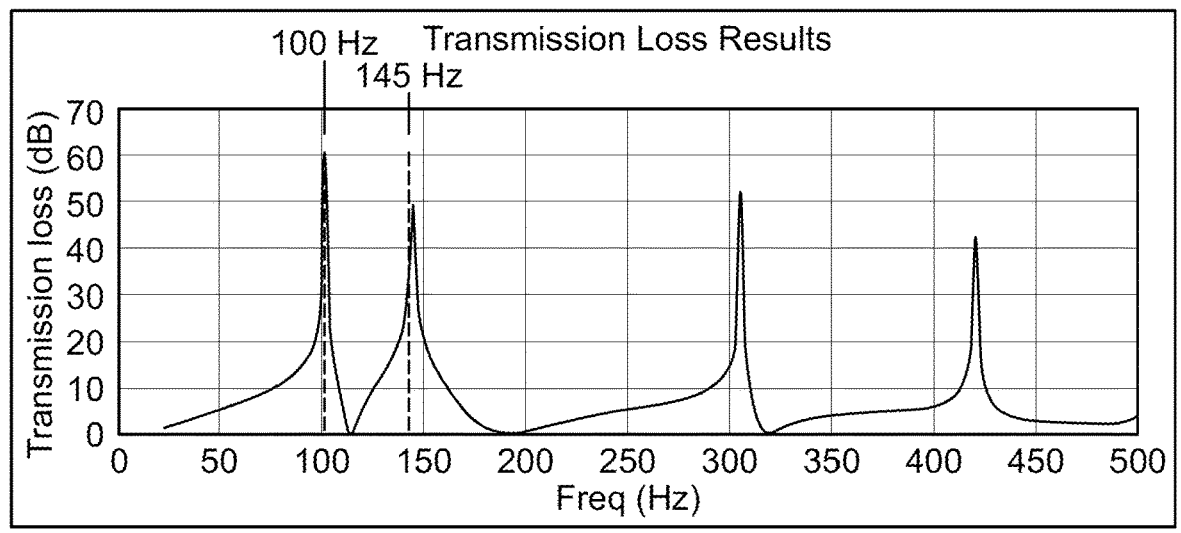
FIG. 4C is a graph showing sound transmission loss results from the use of the cover of FIG. 4A.

FIG. 4C shows a graph of sound transmission loss resulting from the use of the dead-end channel noise reduction device 170, showing the changes in transmission loss as a function of frequency.

Noise Reduction Device with Expansion Chamber

Figure 5:
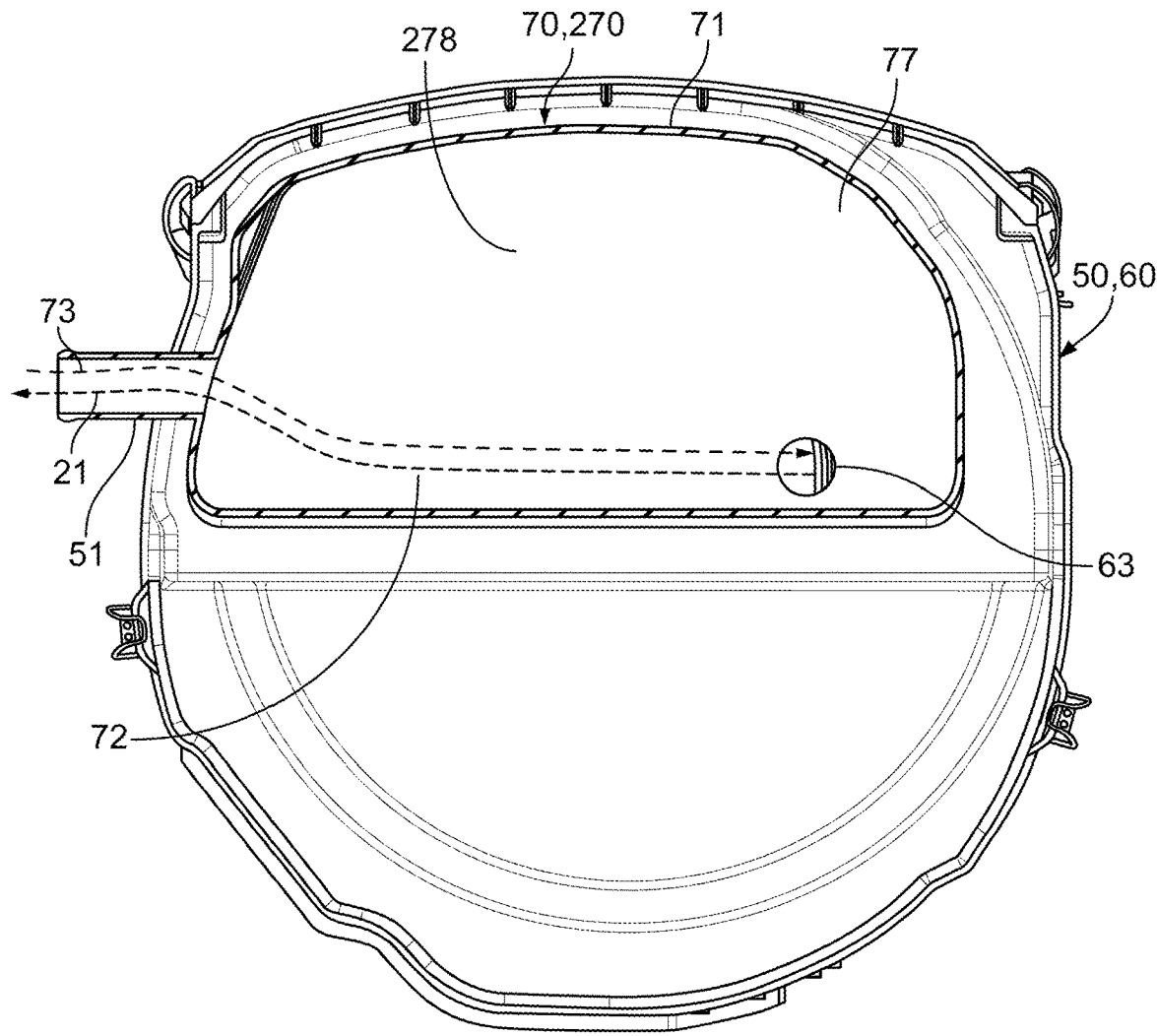
FIG. 5 is a cross-sectional view of a cover of a housing assembly according to another embodiment.

According to another embodiment as shown in FIG. 5, the noise reduction device 70 may comprise an expansion chamber noise reduction device 270, which defines a single flow path (which is the single main flow passage 72) and an expansion area, volume, or chamber 278. The main flow passage 72 and the expansion chamber 278 together define a single, continuous area (i.e., without any walls therebetween) through which the first filtered air flow portion 21 and the sound waves 73 flows. In particular, the main flow passage 72 is positioned within the expansion chamber 278 as the single, continuous area, and the main flow passage 72 extends directly through and within the expansion chamber 278. Accordingly, there are no walls between a majority of a length of the main flow passage 72 and the expansion chamber 278, and the expansion chamber noise reduction device 270 is not subdivided between the main flow passage 72 and the expansion chamber 278.

The expansion chamber 278 provides an area or volume within which the sound waves 73 can expand and dissipate, which results in overall noise reduction. The expansion chamber 278 is positioned along at least the length of the main flow passage 72 (i.e., between the inlet 63 and the first outlet 51 along the flow path of the first filtered air flow portion 21), and may extend beyond the length main flow passage 72. The expansion chamber 278 is defined by the outer wall 76, the inner wall 77, and the side walls 71 of the noise reduction device 70, which allows the expansion chamber noise reduction device 270 to share a common wall with the cover 60 to have a compact design and meet the user's packaging space requirements. The expansion chamber 278 provides a significantly larger available flow area than the inlet 63 and the first outlet 51 and has a cross-sectional area (taken along a plane substantially perpendicular to the direction of fluid flow from the inlet 63 to the first outlet 51) that is substantially larger than the respective cross-sectional areas of the inlet 63 and the first outlet 51. According to one embodiment, the expansion chamber 278 may be approximately 2 liters in volume.

The expansion chamber 278 cancels or substantially dissipates the sound waves 73 that enter into the noise reduction device 70 (through the first outlet 51) from the brake compressor 11, which results in overall noise reduction. As the sound waves 73 from the brake compressor 11 flow toward and into the air cleaner assembly 20 (as described further herein), the expansion chamber 278 along the flow path between the first outlet 51 and the inlet 63 provides a relatively large volume for the sound waves 73 to travel into and expand unrestricted within, until colliding with the inner surfaces of the outer wall 76, the inner wall 77, or the side walls 71. When the sound waves 73 collide with the outer wall 76, the inner wall 77, or the side walls 71, a phase shift occurs, which reverses the direction of the sound waves 73, thereby creating a reversed or reflected sound waves that flows in the opposite direction as the sound waves 73. The reflected sound waves interacts with the sound waves 73, which results in noise reduction.

Noise Reduction Device With Side Channel and Expansion Chamber

Figure 6:
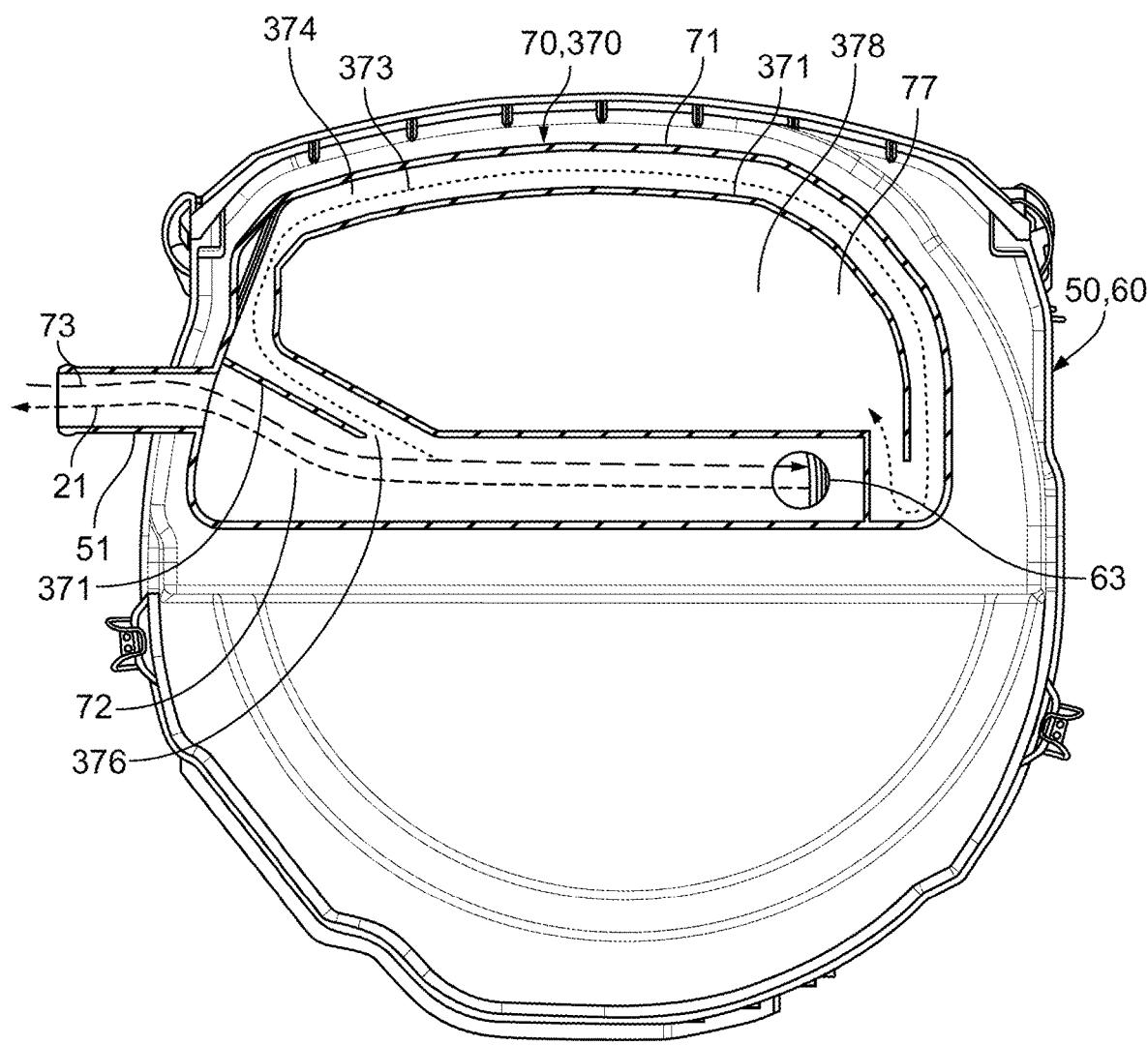
FIG. 6 is a cross-sectional view of a cover of a housing assembly according to yet another embodiment.

According to another embodiment and as shown in FIG. 6, the noise reduction device 70 may comprise an side channel expansion noise reduction device 370, which comprises at least one internal wall 371 and defines the single main flow passage 72, at least one side passage or channel 374, and at least one expansion area, volume, or chamber 378. The side channel expansion noise reduction device 370 may comprise a Helmholtz resonator (e.g., the side channel 374 and the expansion chamber 378) in which the sound reduction is at a single frequency (similar to one of the peaks shown in FIG. 4C). The side channel 374 is configured to receive a portion of the sound wave 73 (i.e., a sound wave portion 373). For example, the side channel expansion noise reduction device 370 is configured and dimensioned such that an oscillation is determined by the mass of the air in the side channel 374 and the stiffness of the air in the expansion chamber 378. The oscillation may cancel out the sound wave portion 373 at the side channel inlet 376 at one particular frequency.

In the side channel expansion noise reduction device 370, the main flow passage 72 is positioned next to or near (rather than extending through and within) the expansion chamber 378 such that the main flow passage 72 and the expansion chamber 378 are separated by at least one wall 371 and only a portion of the sound wave 21 can flow into the expansion chamber 378 in a controlled manner (e.g., via an inlet). Accordingly, the side channel expansion noise reduction device 370 is subdivided between at least the main flow passage 72, the expansion chamber 378, and optionally the side channel 374.

Each of the walls 371 define at least a portion of the side channel 374 (optionally with the side walls 71) and the chamber 378 and extends along its height between the outer wall 76 and the inner wall 77 of the noise reduction device 70 (in a direction parallel to the side walls 71). A first side or surface of the wall 371 defines, corresponds to, or faces at least a portion of a side of the channel 374, and a second side or surface of the same wall 371 defines, corresponds to, or faces at least a portion of the outer perimeter of the expansion chamber 378. Since the channel 374 and the expansion chamber 378 share at least one common wall 371, the side channel expansion noise reduction device 370 has a compact design and can meet the user's packaging space requirements.

The side channel 374 comprises a side channel inlet 376 that is positioned along the main flow passage 72 and provides an area for the sound wave portion 373 to enter or flow into the side channel 374. The channel 374 extends from and branches off of a middle portion of the main flow passage 72 at the side channel inlet 376 (i.e., the side channel inlet 376 of the channel 374 is positioned along the length of the main flow passage 72). The single channel 374 extends between (and defines a flow passage between) the main flow passage 72 and the expansion chamber 378 and merges into the expansion chamber 378 and defines an area or path for the sound wave portion 373 to flow through. The channel 374 and the main flow passage 72 may extend around the entire perimeter of (and define with the walls 371) the expansion chamber 378 (except for the inlet into the expansion chamber 378 from the channel 374). In particular embodiments, an inlet portion of the channel 374 may be angled at an oblique angle relative to the main flow passage 72, in particular along its side channel inlet 376.

The channel 374 has a substantial length and may include at least one (e.g., multiple) turns and curves along its length before the expansion chamber 378 such that the sound wave portion 373 changes direction at least one time within the side channel 370 before reaching the expansion chamber 378. The channel 374 may curve around the outside of at least a portion of the expansion chamber 378. Furthermore, the channel 374 may spiral around itself and/or curve in U-turn (i.e., 180°) about an end of the wall 371. The walls 371 (and the side walls 71) direct the sound wave portion 373 within the channel 374 to turn and curve along the length of the channel 374 such that the sound wave portion 373 changes direction multiple times within the channel 374 before reaching the expansion chamber 378. The sound wave portion 373 refers to the portion of the sound waves 73 that enters into the side channel 374 through the side channel inlet 376 and is traveling away from the main flow passage 72, through the channel 374, and toward the expansion chamber 378 (along the length of the channel 374).

The expansion chamber 378 provides an area or volume within which the sound wave portion 373 can expand and dissipate, which results in overall noise reduction. The expansion chamber 378 is positioned at the end of the channel 374. The expansion chamber 378 is defined by the outer wall 76, the inner wall 77, and the walls 371 (and/or the side walls 71). The expansion chamber 378 provides a significantly larger available flow area (and cross-sectional area taken along a cross-section substantially perpendicular to the direction of flow) than the side channel 374 (as well as the main flow passage 72, the inlet 63, and the first outlet 51). The expansion chamber 378 only has one port (i.e., an entry and exit port), which is at the end of the channel 374, such that the expansion chamber 378 only receives (and can optionally release) the sound wave portion 373 through the one port.

The channel 374 and the expansion chamber 378 together cancel or substantially mitigate the sound waves 73 that enter into the noise reduction device 70 (through the first outlet 51) from the brake compressor 11, which results in overall noise reduction. In particular, as the sound waves 73 from the brake compressor 11 flow toward and into the air cleaner assembly 20 (as described further herein), the channel 374 allows at least a portion of the sound waves 73 flowing through the main flow passage 72 (e.g., the sound wave portion 373) to flow into and through the channel 374, curving along the entire length of the channel 374 until the sound wave portion 373 enters into the expansion chamber 378, as shown in FIG. 6. Once the sound wave portion 373 enters into the expansion chamber 378, the sound wave portion 373 can expand into the expansion chamber 378, and there is a change in impedance of the sound wave portion 373, which results in noise reduction.

According to one embodiment, the side channel expansion noise reduction device 370 comprises a single side channel 374 and a single expansion chamber 378. According to various other embodiments, the side channel expansion noise reduction device 370 may define a plurality of side channels 374 and/or a plurality of expansion chambers 378. For example, the side channel expansion noise reduction device 370 may define multiple side channels 374 all leading to the same one expansion chamber 378 or multiple side channels 374 that lead to individual multiple expansion chambers 378.

Noise Reduction Device With Sound Absorber

Figure 7:
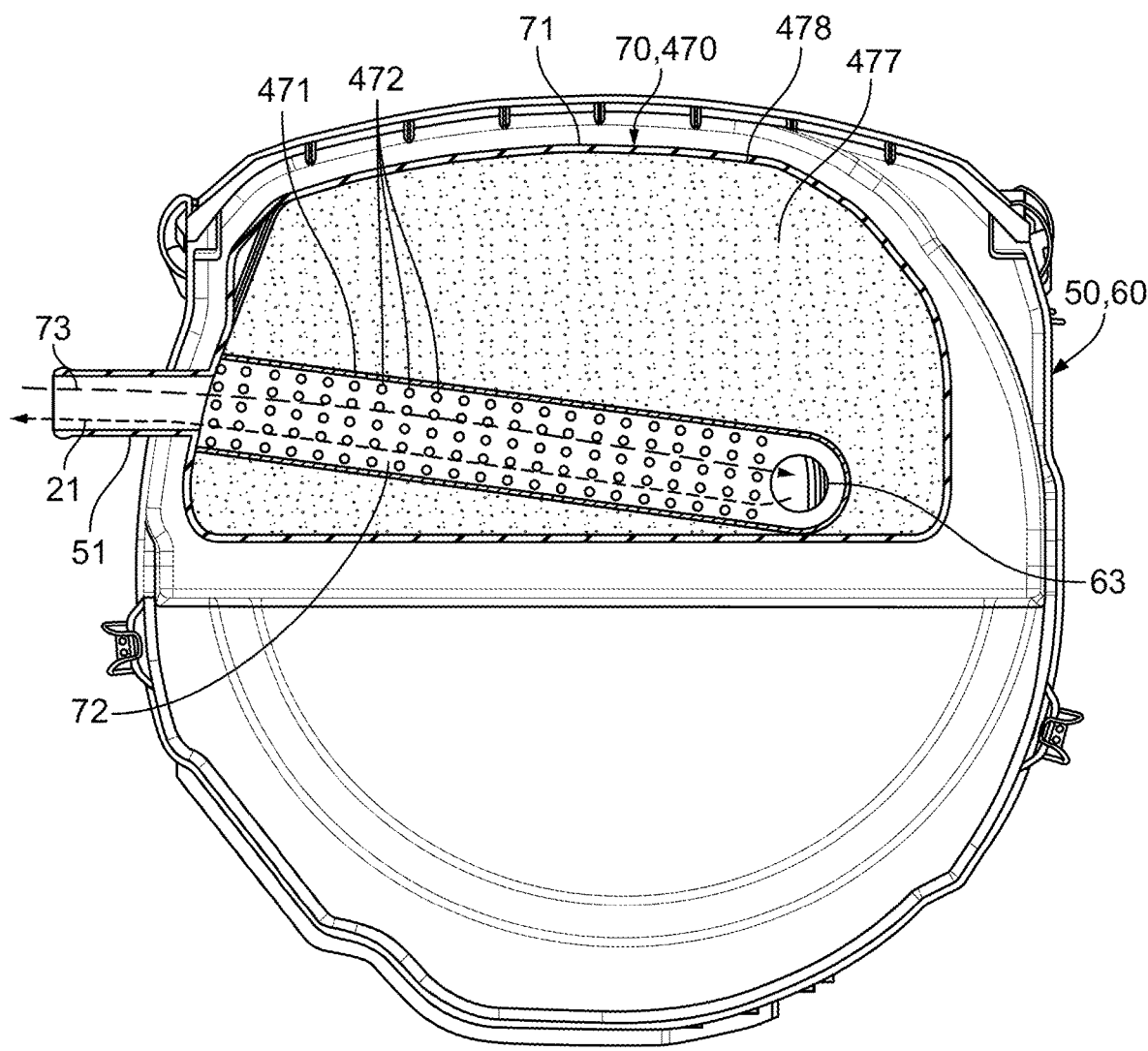
FIG. 7 is a cross-sectional view of a cover of a housing assembly according to still another embodiment.

According to another embodiment as shown in FIG. 7, the noise reduction device 70 may comprise a sound absorber noise reduction device 470 which defines a chamber 478 and comprises a sound absorber 477 and a flow passage wall 471 that defines the single main flow passage 72.

The chamber 478 provides an area or volume through which the main flow passage 72 extends and within which the flow passage wall 471 and the sound absorber 477 are positioned. The chamber 478 is configured to receive at least a portion of the sound waves 73 through the perforations 472 within the flow passage wall 471. The chamber 478 is defined by the outer wall 76, the inner wall 77, and the side walls 71 of the noise reduction device 70. The chamber 478 has a significantly larger area than the area defined by the flow passage wall 471, the inlet 63, and the first outlet 51.

The flow passage wall 471 defines and extends circumferentially around an area or path (i.e., the main flow passage 72) for the first filtered air flow portion 21 and the sound waves 73 to flow through between the inlet 63 and the first outlet 51. The flow passage wall 471 is positioned within the chamber 478 and is positioned within and completely circumferentially surrounded by the sound absorber 477. The flow passage wall 471 defines a single hole or perforation 472 (or a plurality of holes or perforations 472) through which at least a portion of the sound waves 73 can flow through, from the main flow passage 72 and into the chamber 478 and the sound absorber 477. Accordingly, the perforations 472 allow the sound waves 73 to interact with the sound absorber 477 as the sound waves 73 flow into the chamber 478.

The sound absorber 477 is positioned within the chamber 478 and completely surrounds the outside of the flow passage wall 471 (and therefore around the main flow passage 72). The sound absorber 477 is constructed of a sound-absorbing material and is configured to absorb and dissipate the sound waves 73. The sound absorber 477 may be incorporated into the cover 60.

The sound absorber 477 cancels or substantially dissipates the sound waves 73 that enter into the noise reduction device 70 (through the first outlet 51) from the brake compressor 11, which results in overall noise reduction. In particular, as the sound waves 73 from the brake compressor 11 flow toward and into the air cleaner assembly 20 (as described further herein), at least a portion of the sound waves 73 within the main flow passage 72 flow through the perforations 472 and into the sound absorber 477. Due to the sound waves' interaction with the sound absorber 477, the sound waves lose energy, which results in noise reduction.

Exemplary Embodiments

Figure 8A:
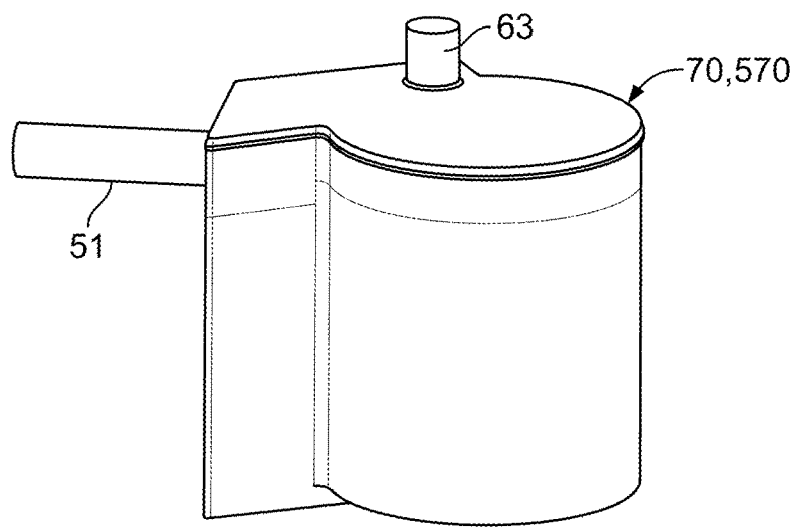
FIG. 8A is a perspective view of a noise reduction device according to one embodiment.
Figure 8B:
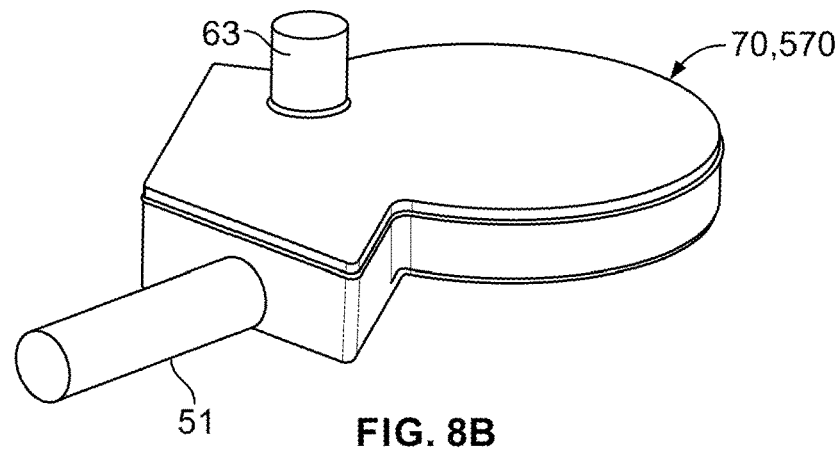
FIG. 8B is a perspective view of a noise reduction device according to another embodiment.
Figure 9:
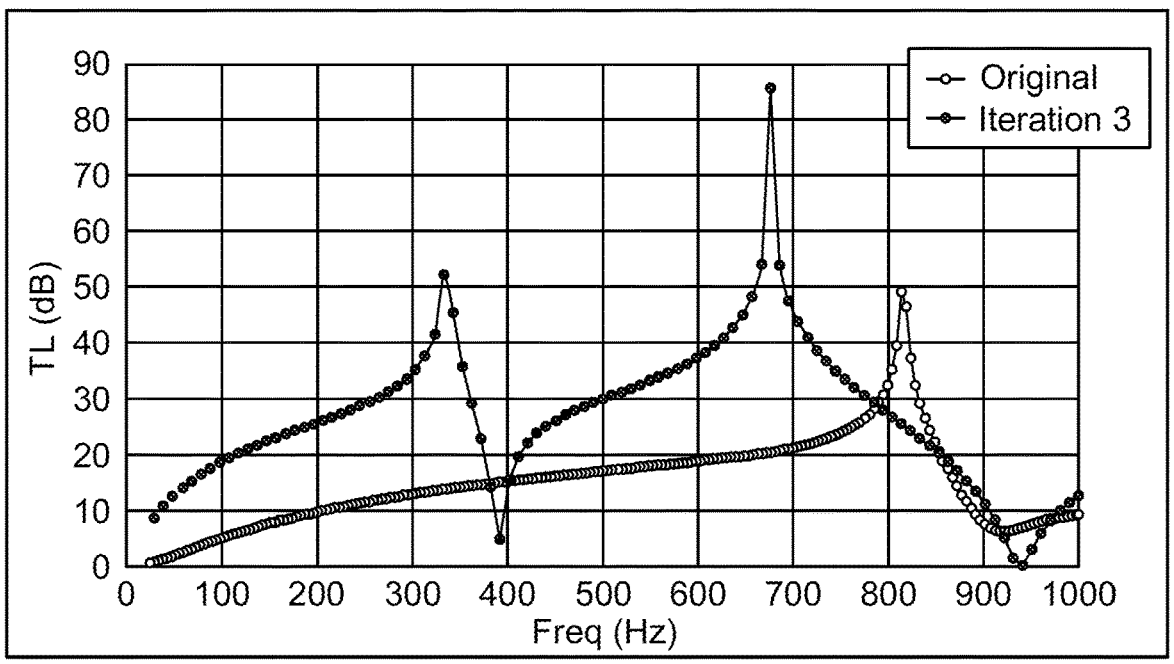
FIG. 9 is a graph of showing sound transmission loss results from use of the noise reduction devices of FIGS. 8A-8B.
Figure 10A:
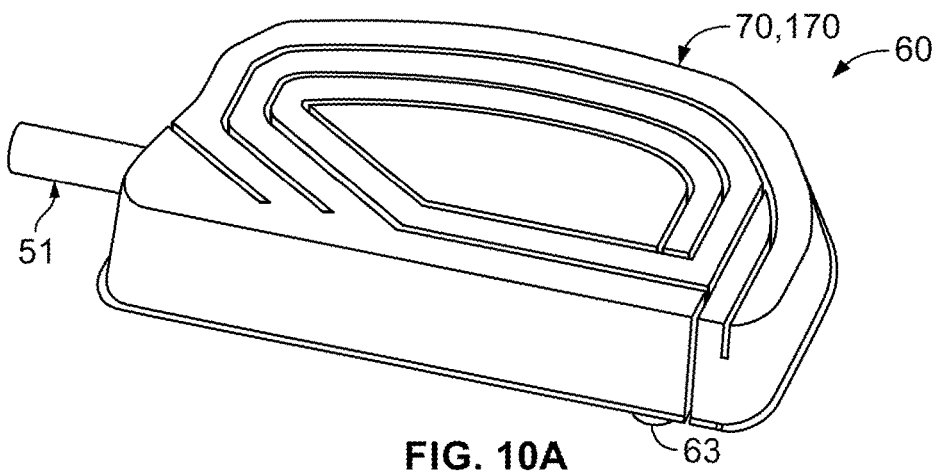
FIG. 10A is a perspective view of a cover with a dead-end channel noise reduction device.
Figure 10B:
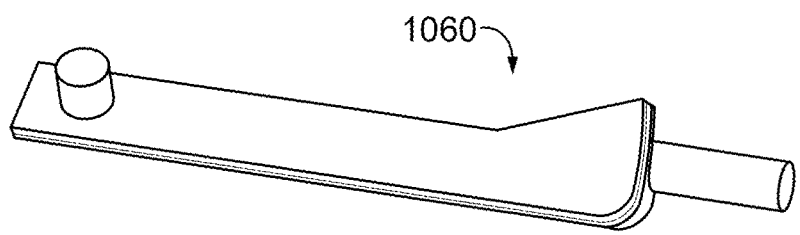
FIG. 10B is a perspective view of a conventional cover.
Figure 10C:
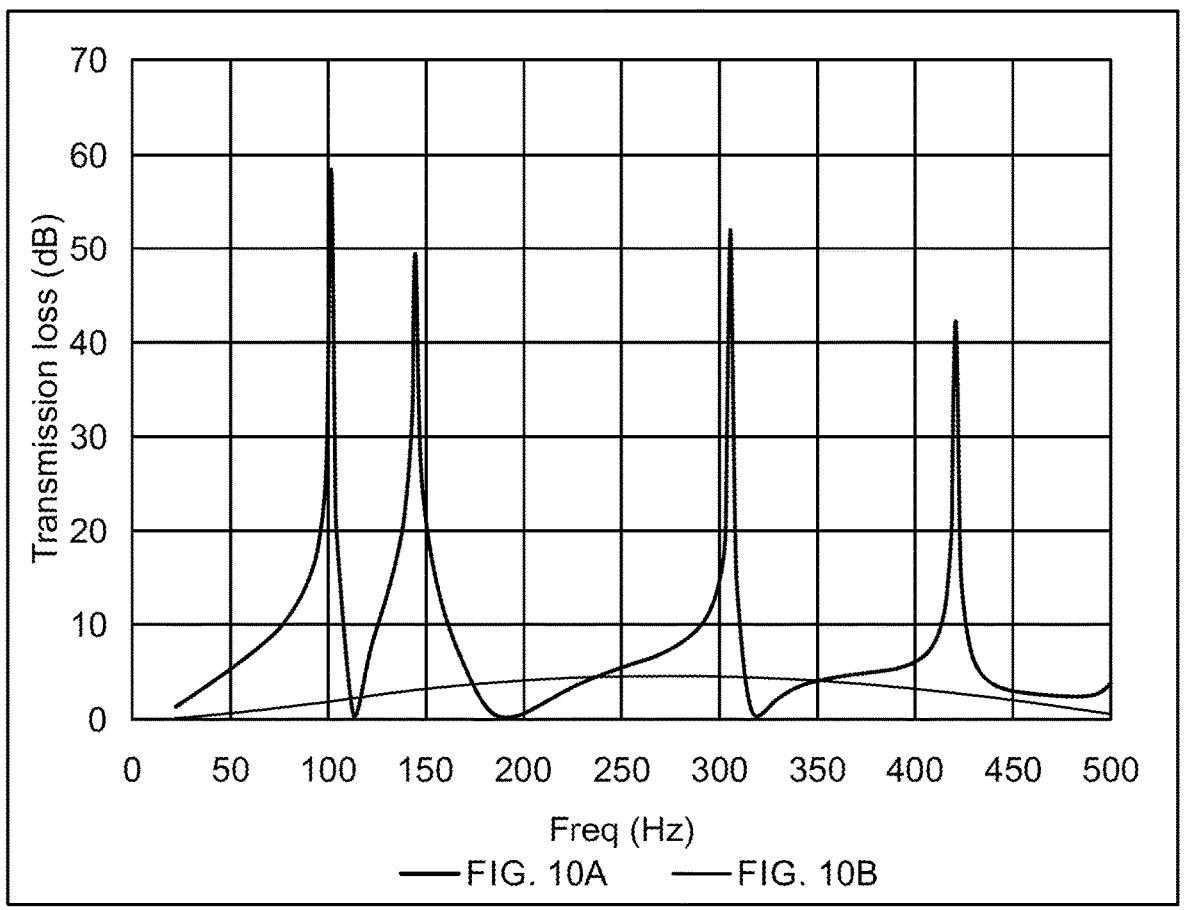
FIG. 10C is a graph showing sound transmission loss results from the use of the covers of FIGS. 10A-10B.

According to various embodiments, the noise reduction device 70 may be configured to reduce noise within the frequency range of approximately 150 hertz (Hz) to approximately 300 Hz. According to one embodiment, the air cleaner assembly 20 may be used with a 16 liter (L) engine.
Expansion-Type Dampers According to various embodiments, the noise reduction device 70 of the cover 60 may be an expansion-type damper 570, as shown in FIGS. 8A-8B. According to one embodiment, the volume of the expansion-type damper 570 may be approximately 4.523e-003 m$^3$. According to another embodiment, the volume of the expansion-type damper 570 may be approximately 8.6233e-004 m$^3$. FIG. 9 is a graph of showing noise transmission loss results for expansion-type dampers 570, showing the changes in transmission loss as a function of frequency.
Testing Results Testing results of the noise reduction device 70 (in particular of the dead-end channel noise reduction device 170) reveal that the noise reduction device 70 is effective within a desired frequency range (of, for example, approximately 150-300 Hz). FIG. 10C shows the effect that the cover 60 in FIG. 10A (which includes the dead-end channel noise reduction device 170) and the conventional cover 1060 in FIG. 10B (which does not have a resonator) have on the transmission loss, showing the changes in transmission loss as a function of frequency.

Each of the various embodiments disclosed herein may have any of the aspects, features, components, and configurations of the other embodiments, except where noted otherwise. As one example, each of the noise-reduction devices 170, 270, 370, and 470 may include any or all aspects, features, components, and configurations of the other of the noise-reduction devices 170, 270, 370, and 470, except where noted otherwise.

As utilized herein, the term "approximately" and similar terms are intended to have a broad meaning in harmony with the common and accepted usage by those of ordinary skill in the art to which the subject matter of this disclosure pertains. The term "approximately" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:
1. An air cleaner assembly comprising:
    a filter element comprising a filter media for filtering a fluid and a first endcap positioned along a first end of the filter media and through which a first filtered air flow portion flows; and
    a housing assembly at least partially containing the filter element and comprising a cover that defines an inlet through which the first filtered air flow portion flows from the filter media and a first outlet through which the first filtered air flow portion flows to a downstream device, the cover comprising a noise reduction device that receives the first filtered air flow portion and dissipates sound waves traveling upstream from the downstream device, the noise reduction device comprising an inner wall, an outer wall spaced axially from the inner wall, and a side wall extending axially between the inner and outer wall, the inlet extends through the inner wall in an axial direction and the first outlet extends through the side wall in a radial direction;

wherein the noise reduction device defines at least one dead-end channel that comprises a dead end that cancels at least a part of the sound waves that enter into the noise reduction device.

2. The air cleaner assembly of claim 1, wherein the cover comprises the inlet through which the first filtered air flow portion flows, the noise reduction device positioned between the inlet and the first outlet of the cover along a flow path of the first filtered air flow portion.

3. The air cleaner assembly of claim 1, wherein the noise reduction device defines a main flow passage that extends directly between the inlet of the cover and the first outlet in a radial direction.

4. The air cleaner assembly of claim 3, wherein the main flow passage is positioned such that the first filtered air flow portion flows from the inlet of the cover, through the main flow passage, and to the first outlet, and the main flow passage being further positioned such that the sound waves flow from the first outlet, through the main flow passage, through the inlet of the cover, and subsequently into an inner area of the filter element, in an opposite direction as the first filtered air flow portion.

5. The air cleaner assembly of claim 3, wherein the at least one dead-end channel extends from and branches off of a middle portion of the main flow passage at a dead-end channel inlet of the at least one dead-end channel.

6. The air cleaner assembly of claim 5, wherein the at least one dead-end channel is completely enclosed by walls except at the dead-end channel inlet.

7. The air cleaner assembly of claim 3, wherein the at least one dead-end channel is configured to receive a portion of the sound waves, the dead end preventing the portion of the sound wave from traveling any further along a length of the at least one dead-end channel and causes the portion of the sound waves to reverse direction within the at least one dead-end channel and thereby create a reflected sound wave portion that flows in an opposite direction through the dead-end channel.

8. The air cleaner assembly of claim 3, wherein the at least one dead-end channel is configured to receive a portion of the sound waves, the at least one dead-end channel including at least one turn along its length before the dead end such that the portion of the sound waves changes direction at least once within the at least one dead-end channel before reaching the dead end.

9. The air cleaner assembly of claim 3, wherein the noise reduction device defines an expansion chamber that has a larger available flow area than the inlet of the cover and the first outlet and within which the sound waves can expand and dissipate.

10. The air cleaner assembly of claim 9, wherein the main flow passage extends directly within the expansion chamber such that there are no walls between a majority of a length of the main flow passage and the expansion chamber.

11. The air cleaner assembly of claim 9, wherein the noise reduction device further defines a side channel that branches off of a middle portion of the main flow passage at a side channel inlet of the side channel and extends between the main flow passage and the expansion chamber.

12. The air cleaner assembly of claim 11, wherein the side channel is configured to receive a portion of the sound waves, and the side channel includes at least one turn along its length before the expansion chamber such that the portion of the sound waves changes direction at least one time within the side channel before reaching the expansion chamber.

13. The air cleaner assembly of claim 3, wherein the noise reduction device comprises a sound absorber that absorbs the sound waves.

14. The air cleaner assembly of claim 13, wherein the noise reduction device comprises a flow passage wall that extends circumferentially around the main flow passage, the flow passage wall circumferentially surrounded by the sound absorber.

15. The air cleaner assembly of claim 14, wherein the flow passage wall defines a plurality of perforations through which at least a portion of the sound waves can flow through, from the main flow passage and into the sound absorber.

16. The air cleaner assembly of claim 1, wherein a filtered air flow separates into the first filtered air flow portion and a second filtered air flow portion downstream of the filter media, the downstream device being a first downstream device, and the housing assembly defining a second outlet through which the second filtered air flow portion flows to a second downstream device.

17. The air cleaner assembly of claim 16, wherein the filter element comprises a second endcap positioned along a second end of the filter media, the second endcap defining an opening through which the second filtered air flow portion flows from an inner area of the filter media to the second outlet, and the opening of the second endcap being larger than an outlet port of the first endcap such that a flow of the second filtered air flow portion flows more unrestricted through the opening of the second endcap compared to a flow of the first filtered air flow portion through the outlet port of the first endcap.

18. An air cleaner assembly comprising:

a filter element comprising a filter media for filtering a fluid and a first endcap positioned along a first end of the filter media and through which a first filtered air flow portion flows; and a housing assembly at least partially containing the filter element and comprising a cover that defines an inlet through which the first filtered air flow portion flows from the filter media and a first outlet through which the first filtered air flow portion flows to a downstream device, the cover comprising a noise reduction device that receives the first filtered air flow portion and dissipates sound waves traveling upstream from the downstream device, the noise reduction device comprising an inner wall and a side wall, the inlet extends through the inner wall and the first outlet extends through the side wall;

wherein the noise reduction device defines at least one dead-end channel that comprises a dead end that cancels at least a part of the sound waves that enter into the noise reduction device; and wherein the noise reduction device defines a main flow passage that extends directly between the inlet of the cover and the first outlet, wherein the noise reduction device defines an expansion chamber that has a larger available flow area than the inlet of the cover and the first outlet and within which the sound waves can expand and dissipate, wherein the noise reduction device further defines a side channel that branches off of a middle portion of the main flow passage at a side channel inlet of the side channel and extends between the main flow passage and the expansion chamber, wherein the side channel and the expansion chamber share at least one common wall.

19. A housing assembly for at least partially containing a filter element for filtering a fluid, the housing assembly comprising:
    a cover that defines an inlet through which a first filtered air flow portion flows from a filter media and a first outlet through which the first filtered air flow portion flows to a first downstream device, the cover comprising a noise reduction device that receives the first filtered air flow portion and dissipates sound waves traveling upstream from the first downstream device, the noise reduction device comprising an inner wall, an outer wall spaced axially from the inner wall, and a side wall extending axially between the inner wall and the outer wall, the inlet extends axially through the inner wall and the first outlet extends radially through the side wall; and
    a housing body removably attachable to the cover and defining a second outlet through which a second filtered air flow portion flows to a second downstream device;
    wherein the noise reduction device defines at least one dead-end channel that comprises a dead end and cancels at least a part of the sound waves that enters into the noise reduction device.

20. The housing assembly of claim 19, wherein the noise reduction device is positioned between the inlet and the first outlet of the cover along a flow path of the first filtered air flow portion.

21. The housing assembly of claim 19, wherein the at least one dead-end channel extends from and branches off of a middle portion of a main flow passage at a dead-end channel inlet of the at least one dead-end channel, the main flow passage extending directly between the inlet of the cover and the first outlet.

22. The housing assembly of claim 19, wherein the noise reduction device defines an expansion chamber that has a cross-sectional area that is larger than the inlet of the cover and the first outlet and within which the sound waves can expand and dissipate.

23. The housing assembly of claim 19, wherein the noise reduction device comprises a sound absorber that absorbs the sound waves.

24. The housing assembly of claim 19, wherein the second outlet extends in an axial direction parallel to the inlet.

* * * * *